July 18, 1944.     O. KLUTE     2,353,834
TOOL HOLDER FOR REAMERS
Filed Dec. 3, 1941     2 Sheets-Sheet 1
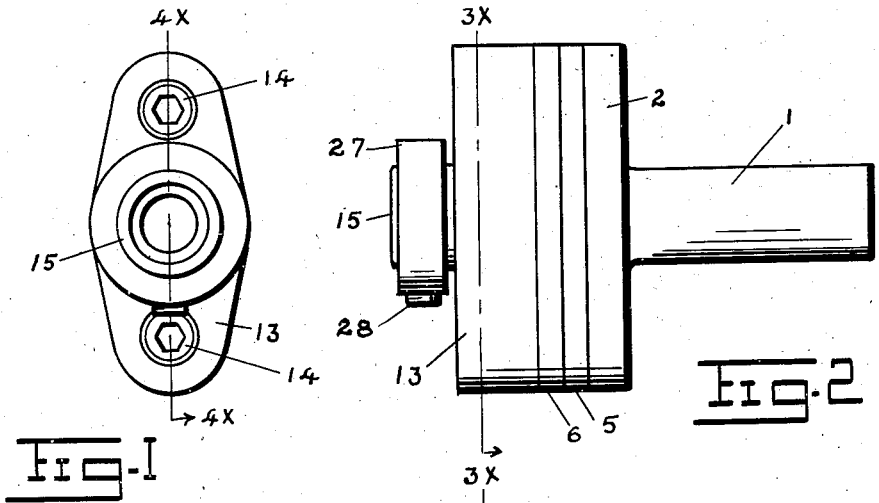
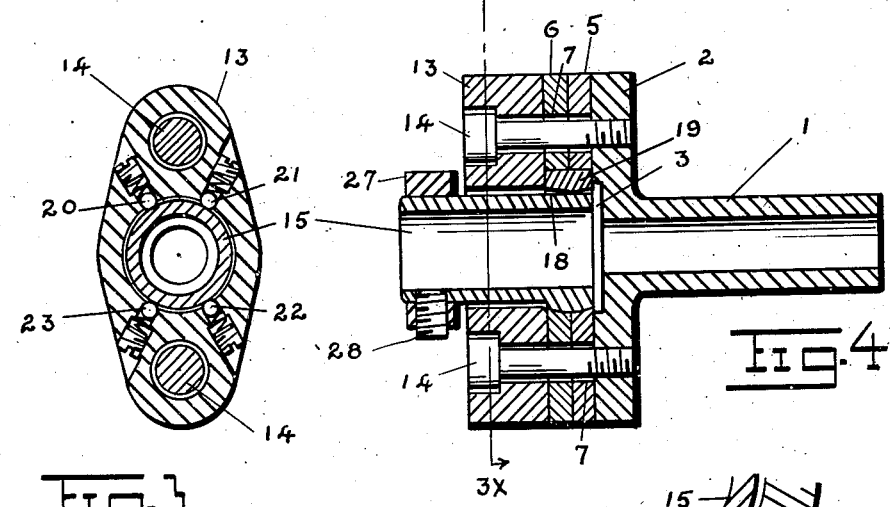
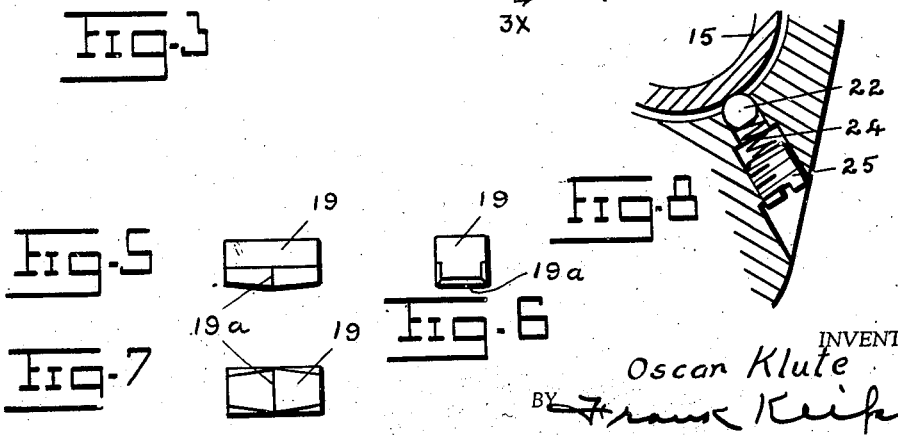
INVENTOR.
Oscar Klute
BY Frank Keifer
ATTORNEY.

July 18, 1944.  O. KLUTE  2,353,834
TOOL HOLDER FOR REAMERS
Filed Dec. 3, 1941  2 Sheets-Sheet 2

INVENTOR.
Oscar Klute
BY Frank Keifer
ATTORNEY.

Patented July 18, 1944

2,353,834

UNITED STATES PATENT OFFICE 2,353,834

TOOLHOLDER FOR REAMERS

Oscar Klute, Rochester, N. Y.

Application December 3, 1941, Serial No. 421,471

16 Claims. (Cl. 279—16)

It is the regular practice in making so-called screw machine parts to use so-called screw machine or turret lathes. Many kinds of screw machine parts have a hole bored in one end thereof, and this hole must then be reamed out or finished to the correct size or diameter. The finished hole must be kept concentric with the outside of the screw machine part and must have the same diameter throughout. In finishing such holes it is the usual practice to use a reamer. When a screw machine or turret lathe is new the reamer mounted thereon will ordinarily be accurately centered with the hole in the stock to be reamed. It will also be understood that the stock is carried on the spindle and rotates with the spindle, and the drill and boring tool on the turret remains stationary while they are being used in the boring operation.

It will also be understood that as the parts of the machine wear, the turret will drop down and the reamer carried thereon will be out of line with the center line of the spindle by a few thousandths of an inch. If the spindle is belt driven from an overhead pulley it has a tendency to raise the spindle and the stock, so that the reamer on the turret lathe will be out of line with the center of the stock that is carried on the spindle. This difference sometimes amounts to .020''.

It is also understood that while the boring tool in the turret lathe will cut the hole accurately in the stock, the reamer will not finish the hole accurately unless it is accurately centered with the hole to start with.

Unless this is corrected, the hole will be finished by the reamer with a taper, which must be avoided. To correct such errors in the centering of the reamer, if they exist, namely, in order to bring the reamer on the turret accurately into line with the hole in the stock on the spindle, I have made an invention, the objects of which are described as follows:

One object of this invention is to provide a tool holder held by the turret, which holder contains certain parts that support the reamer. These parts will be adjustable and can be released or unclamped from each other at the start while the reamer is being centered in the hole previously bored in the stock. With the reamer thus centered, the moving parts will thereby be placed in proper adjustment and can then be clamped together for the purpose of holding the reamer in correct position during the reaming operation.

Another object of this invention is to provide a tool holder which will hold the reamer in correct position during the reaming operation and still permit it to float to a very small extent to adjust itself.

Another object of the invention is to provide a tool holder that will hold the reamer firmly and yet permit the reamer to follow the hole that has previously been bored in the stock that is to be finished by the reamer.

Another object of the invention is to provide a tool holder with a flanged head thereon and three plates clamped thereon, said plates being adjustable in any direction on the flanged head.

Another object of the invention is to provide a tool holder comprising a shank having a flanged head thereon, on which head are held two plates having a hollow seat between them, which seat has the shape of the frustum of a hollow sphere, or what is left of a hollow sphere after two substantially equal segments have been cut therefrom.

Another object of the invention is to form a spherical seat in two parallel plates of substantially equal thickness, one-half of the seat being formed in each of the plates.

Another object of the invention is to provide the tool holder with a hollow sleeve having a male part on one end thereof constituting a spherical zone, or the frustum of a sphere, which male part engages with the spherical seat substantially in the manner as a ball joint engaging in a socket, thus forming a thrust bearing in which the moving member can tilt.

Another object of the invention is to provide a keyway both in the male part and the female part of the ball and socket joint, in which keyway is provided a key, said key making a close fit in the keyway contained in the two parallel plates and loosely engaging with that part of the keyway that is carried in the male member, to hold the male member against rotation.

Another object of the invention is to form the key with a rectangular base engaging the keyway in the plates, and a bottom, so to speak, engaging with the sleeve, the bottom of the key tapering with a slight taper on the central line thereof, the central line coinciding with the plane of the equator of the seat.

Another object of the invention is to form the sleeve with a male ball member on one end thereof, and form the seat therefor in the central opening of two plates which are brought together to form a spherical seat that makes a working fit with the ball member on the sleeve, the two plates being then rigidly fastened together by rivets with the ball member between them.

Another object of the invention is to provide a tool holder comprising a support having a flanged head thereon on which head are held two plates having a hollow seat formed between them, and on the outside of which is a third plate, with binding screws passing through and clamping the three plates to the flanged head.

Another object of the invention is to provide holes in the three plates that are considerably larger than the screws, so that the plates may adjust themselves laterally on the flanged head with reference to the screws and the head.

Another object of the invention is to provide a plurality of sockets in the third plate extending from the outside of the plate to the central opening therein and provide in those sockets spring pressed balls that yieldingly hold the sleeve centered in the front plate.

Another object of the invention is to make the sleeve with a male spherical surface on the end thereof and a cylindrical surface forward thereof, and to make the spherical surface of the sleeve have a good sliding fit with its bearing and make the cylindrical surface of the sleeve fit loosely in the hole in the third plate, the diameter of the hole in the plate being about $\frac{3}{32}$ of an inch greater than the diameter of the cylindrical part of the sleeve.

Another object of the invention is to provide a collar on the outer end of the sleeve, held thereon with a pressed fit, and provide a set screw working in the collar and the sleeve, which set screw is adapted to clamp the reamer and hold it against rotation in the sleeve.

These and other objects of the invention will be illustrated in the drawings, described in the specification, and pointed out in the claims at the end thereof.

In the drawings:

Figure 1 is a front elevation of the tool holder assembled.

Figure 2 is a side elevation of the tool holder assembled.

Figure 3 is a section on the line $3x-3x$ of Figures 2 and 4.

Figure 4 is a section on the line $4x-4x$ of Figure 1, showing the axis of the sleeve in line with the axis of the shank.

Figure 5 is a side elevation of the key.

Figure 6 is an end elevation of the key.

Figure 7 is a bottom plan view of the key, it being understood that Figures 5, 6 and 7 show the key on an enlarged scale.

Figure 8 is a detail view of one of the sockets with its spring pressed ball, the parts being shown on a larger scale than the corresponding parts in Figure 3.

In the drawings like reference numerals indicate like parts.

Figure 9:
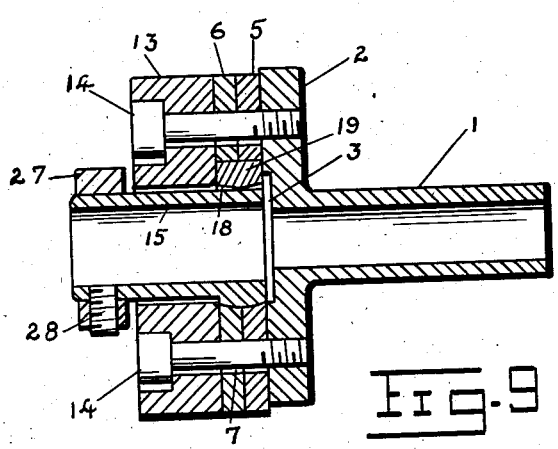
Figure 9 is a section on the line $4x-4x$ of Figure 1, showing the axis of the sleeve out of line with but parallel to the axis of the shank.

In the drawings, reference numeral 1 indicates the shank of the tool holder having a flanged oblong head 2 integral therewith. The central part of the flanged head is cut away or counterbored at 3 to form a recess, the purpose of which will presently be described.

Figure 11:
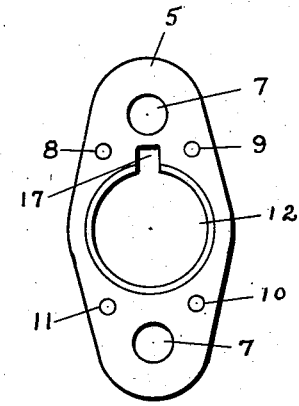
Figure 11 is a detail view of one of the oblong plates forming a spherical seat, the two plates being alike.

On the forward end of this oblong shaped head are placed two plates 5 and 6, which plates are shown in cross section in Figures 4, 9, 10 and 13, and in end elevation in Figure 11. Each of these plates has two smooth holes therein 7, 7, through which screws are adapted to pass, and each of the plates is also provided with four rivet holes 8, 9, 10 and 11, through which pass rivets by which the plates are permanently fastened together. Each of these plates has a large central opening therein 12 and the opening in each plate is concaved in such manner that when the two plates are joined together as shown in Figures 4, 9, 10 and 13, they form together a spherical socket having the shape of the frustum or equatorial zone of a hollow sphere.

An oblong plate 13, somewhat thicker than either of the plates 5 and 6, is placed on the outside of the two plates 5 and 6 shown in Figures 4, 9, 10 and 13. This plate is counterbored to form recesses for the heads of screws 14, 14, the shanks of which pass through the plate 13 and the two plates 5 and 6 and make threaded engagement with the oblong head 2 which is formed integral with the shank. The openings in the plates 5, 6 and 13 are somewhat larger than the shanks of the screws, to permit lateral adjustment of the plates on the screws and on the flanged head 2, for a purpose that will presently be described.

A sleeve 15 is provided having the male member 16 formed on the end thereof, which male member is formed in the frustum of a sphere that is adapted to fit in an make a close sliding engagement with the spherical seat formed in the plates 5 and 6. This sleeve with its spherical male member 16 is formed, and then the plates 5 and 6 are assembled so that the spherical seat engages with the male member and the two plates are then fastened together by the rivets in the holes 8, 9, 10 and 11.

Figure 12:
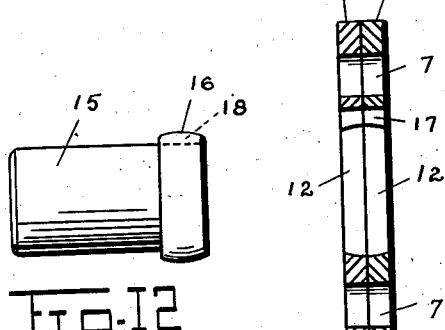
Figure 12 is a side elevation of the sleeve and the male spherical part on the end thereof.
Figure 13:
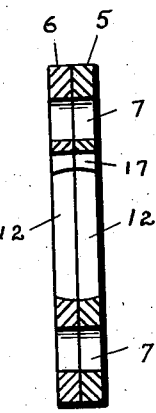
Figure 13 is a sectional view of the two plates placed together in the absence of the sleeve and its male spherical member.
Figure 14:
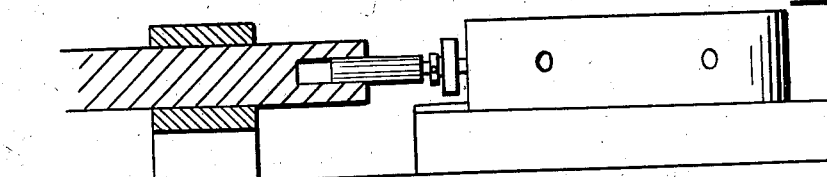
Figure 14 is a diagrammatic view of the turret lathe equipped with the tool holder which constitutes this invention and a reamer, the reamer being shown engaged with the stock.

A keyway 17 is cut in the plates 5 and 6, and a corresponding keyway is cut in the male member 16, as indicated at 18 in Figure 12. A key 19 such as is shown in Figures 5, 6 and 7 is inserted in these two keyways. The top of the key is rectangular in shape and makes a pressed fit with the keyway of the plates and the bottom of the key has a ridge 19a thereon which makes a rocking fit with the keyway 18 of the male member 16 on the sleeve 15. This key holds the sleeve and the reamer against rotation in the shank, which is also held against rotation and permits the sleeve 15 to rock thereon.

The plate 13 has a central opening therein that is about $\frac{3}{32}$ of an inch larger than the outside diameter of the sleeve 15, which permits the sleeve and the plates 5 and 6 to shift laterally therein before the screws 14 have been tightened up, and also permits the outer end of the sleeve 15 to tilt or gyrate in said opening on a center that is contained in the spherical or ball and socket bearing, above described.

In Figure 4 I have shown the sleeve 15 with its axis in line with the axis of the shank 1. In Figure 9 I have shown the axis of the sleeve lower than the axis of the shank, but parallel thereto, and it will also be understood that it can be higher by an equal amount or shifted sideways, or in any intermediate direction.

Figure 10:
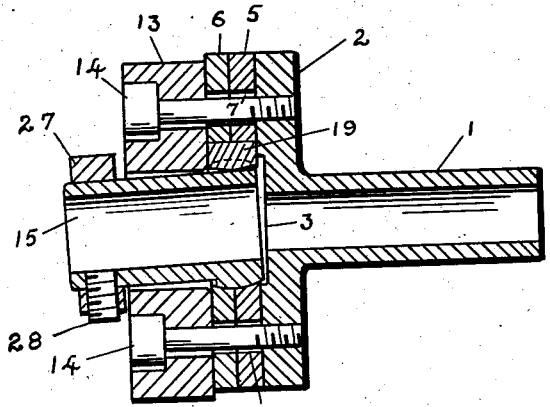
Figure 10 is a section on the line $4x-4x$ of Figure 1, showing the axis of the sleeve tilted at an angle to the axis of the shank.

In Figure 10 I have shown the axis of the sleeve tilted at an angle to the axis of the shank, with the lower end of the sleeve projecting into the recess 3 formed in the flange 2 by counterboring.

To steady the outer end of the sleeve 15, I provide four spring pressed balls bearing against the outer end of the sleeve as shown in Figure 3. These balls are numbered 20, 21, 22 and 23. Each of these balls is held in a socket of small diameter that is sufficiently choked to keep the ball from passing through but permits the exposed tip of the ball to bear against the sleeve 15. These balls are each backed by a spring 24 held in place by a set screw 25, which makes threaded engagement with the outer end of the socket, which is somewhat larger in diameter than the inner end of the socket. In this way the outer end of the sleeve is held steady.

On the outer end of the sleeve 15 a collar 27 is placed with a pressed fit. In this collar and sleeve is a threaded hole adapted to receive the set screw 28, by which the shank of the reamer is fastened in the sleeve.

In assembling this tool, the sleeve is first assembled with the plates 5 and 6, which are riveted together after the male member 16 has been placed between the plates. The key is then inserted in the assembly. These plates and sleeve are then assembled with the plate 13, and are then fastened together by the screws 14, 14. The collar 27 is then put in place with the set screw 28. The tool holder is then ready for use in the screw machine, or turret lathe.

The reaming tool is then inserted in the sleeve 15 of the tool holder, and the screws 14, 14 are released so that the plates 5, 6 and 13 can adjust themselves independently of each other and the head 2 of the tool holder.

The tool holder is then placed in the turret head. Then the turret head is moved forward, pushing the reaming tool into the hole that is to be finished. The plates 5, 6 and 13 can then adjust themselves independently of each other and independently of the head 2 of the tool holder. The screws 14, 14 are then tightened up, and the tool and tool holder are ready for use, and the set-up is then ready to perform the reaming operation.

It will also be understood that because of possible errors in the screw machine, the parts of the tool holder will automatically take the various positions shown in the drawings. As long as the axis of the sleeve 15 is parallel to the axis of the shank 1, the holes in the plates 5, 6 and 13 will line up with each other as shown in Figures 4 and 9, but if the axis of the sleeve and of the shank are at an angle to each other, as shown in Figure 10, the plate 13 will shift on the assembly 5 and 6, and then they can be clamped together in such shifted position with the certainty that the reaming tool will function correctly in finishing the hole.

I claim:

1. In a tool holder for a reamer, the combination of a shank having a large flanged head on the forward end thereof, a sleeve having a spherical male member on the rear end thereof, means for holding the sleeve so that it cannot turn on the shank, said holding means permitting the axis of the sleeve to float angularly and laterally with reference to the axis of the shank, a flat plate having a hole central therein between which plate and the flanged head said means is clamped, said clamping means permitting the lateral adjustment of the holding means.

2. In a tool holder for a reamer, the combination of a shank having a large flanged head on the forward end thereof, a sleeve having a spherical male member on the rear end thereof, means for holding the sleeve so that it cannot turn on the shank, said means being adjustable to permit the axis of the sleeve to float freely laterally into and out of line with the axis of the shank or at an angle thereto, said means being capable of being clamped firmly in position to thereafter limit the floating of the sleeve on the shank, said holding means comprising two parallel plates having a spherical bearing between them adapted to hold said spherical male member, said means also comprising a flat plate having a hole central therein between which plate and the flanged head the two parallel plates are clamped.

3. In a tool holder for a reamer, the combination of a shank having a flanged head on the forward end thereof, a recess formed centrally in said flanged head, a sleeve having a spherical male member on the rear end thereof, a spherical bearing engaging the forward and rear sides of said spherical male member and making a sliding fit therewith, a keyway in both the spherical bearing and in the spherical male member, a key engaging therein to hold the sleeve against rotation in its spherical bearing, said key being beveled forward and back from a central line extending transversely to the sleeve, said sleeve being adapted to rock on said central line of the key while being held against rotation by the key.

4. In a tool holder for a reamer, the combination of a shank having a flanged head on the forward end thereof, a recess formed centrally in said flanged head, a sleeve having a spherical male member on the rear end thereof, a spherical bearing engaging the forward and rear sides of said spherical male member, in which bearing the spherical male member is adapted to rock by moving one side thereof into or out of said recess, a flat plate having a hole central therein forward of the spherical bearing between which plate and the flanged head the spherical bearing is clamped.

5. In a tool holder for a reamer, the combination of a shank having a flanged head on the forward end thereof, a recess formed centrally in said flanged head, a sleeve having a spherical male member on the rear end thereof, a spherical bearing engaging the forward and rear sides of said spherical male member, in which bearing the spherical male member is adapted to rock by moving one side thereof into or out of said recess, a keyway in both the spherical bearing and in the spherical male member, a key engaging therein to hold the sleeve against rotation in its spherical bearing, said key being beveled forward and back from a central line extending transversely to the sleeve, said sleeve being adapted to rock on said central line of the key while being held against rotation by the key.

6. In a tool holder for a reamer, the combination of a shank having a flanged head on the forward end thereof, a sleeve having a spherical male member on the rear end thereof, a spherical bearing engaging the forward and rear sides of said spherical male member and making a sliding fit thereon, said spherical bearing being formed in two flat plates, which plates are assembled by bringing the plates together one on each side of the spherical male member and then fastening said plates together, said plates being adjustable laterally on the flanged head, each of said plates having a complete circular opening therein, the circular opening in each plate having the shape of one-half of an equatorial zone, the plates being joined together on the equatorial line, and a flat plate having a hole central therein between which plate and the flanged head said plates are clamped.

7. In a tool holder for a reamer, the combination of a sleeve having a spherical male member on the rear end thereof, a spherical bearing engaging the forward and rear sides of said spherical male member and making a sliding fit thereon, said spherical bearing being formed of two flat plates, which plates are assembled by bringing the plates together one on each side of the spherical male member and then fastening the plates together enclosing the spherical male member between them, a flanged head on one side of said plates, a flat plate having a hole central therein on the other side of said plates between which head and plate the two plates are clamped together.

8. In a tool holder for a reamer, the combination of a shank having a flanged head on the forward end thereof, a pair of plates placed on said flanged head, said plates enclosing a spherical bearing between them when brought together, a third plate placed on the outer end of the pair of plates, a pair of screws passing through holes in the three plates and making threaded engagement with the flange on the shank, the holes in the three plates through which the screws pass being considerably larger than the stem of the screw to permit lateral adjustment of the plates on the flanged head, said screws serving to clamp the three plates in any desired position on the flanged head.

9. In a tool holder for a reamer, the combination of a shank having a flanged head on the forward end thereof, a pair of plates placed on said flanged head, said plates enclosing a spherical bearing between them when brought together, a third plate placed on the outer end of the pair of plates, a pair of screws passing through holes in the three plates and making threaded engagement with the flange on the shank, the holes in the three plates through which the screws pass being considerably larger than the stem of the screw to permit lateral adjustment of the plates on the flanged head, said screws serving to clamp the three plates in any desired position on the flanged head, each of these plates having a large central opening, a sleeve loosely held in said central opening at the forward end thereof, said sleeve at the rear end having a male spherical member thereon, said pair of plates having a spherical bearing formed between them in which the male spherical member engages, a keyway in the pair of plates and in the male spherical member, a key engaging the pair of plates and the sleeve and its spherical member adapted to hold the sleeve against rotation, but permit the forward end of the sleeve to move and rock the male member in its bearing.

10. A sleeve having a spherical male member, a spherical bearing in which the male member engages, a key for holding the male member against rotation in the bearing, a pair of flat plates in which said spherical bearing is formed, a keyway in said plates in which said key engages, a flanged head on one side of said plates and a flat plate having a hole central therein on the other side of said plates between which head and plate the pair of flat plates is clamped.

11. A sleeve having a spherical male member, a spherical bearing in which the male member engages, a key for holding the male member against rotation in the bearing, said key having a rectangular base on one side and on the other side having a ridge extending transversely of the sleeve said key being beveled on each side of said ridge.

12. In a tool holder for a reamer, the combination of a sleeve having a spherical male member on the rear end thereof, a spherical bearing engaging the forward and rear sides of said spherical male member and making a sliding fit thereon, two flat plates in which said spherical bearing is formed, said plates being assembled by bringing the plates together one on each side of the spherical male member and then fastening the plates together enclosing the spherical male member between them, and a key way in the plates and in the spherical male member, a key inserted therein for holding the sleeve and its male member against rotation on the axis of the sleeve, a flanged head and a flat plate having a hole central therein between which head and plate the two flat plates are clamped.

13. In a tool holder for a reamer, the combination of a shank having a flanged head on the forward end thereof, a pair of flat plates placed on said flanged head, said plates enclosing a spherical bearing between them when brought together and being adjustable laterally on said head, a flat plate having a hole central therein between which plate and the flanged head, said pair of plates is clamped.

14. In a tool holder for a reamer, the combination of a shank having a flanged head on the forward end thereof, a pair of flat plates placed on said flanged head, said plates enclosing a spherical bearing between them when brought together, a third plate placed on the outer end of the pair of plates, means for clamping the plates to the head said plates being adjustable laterally on said head.

15. In a tool holder for a reamer the combination of a sleeve for holding the reamer, means for holding said sleeve normally in a central position, said means permitting said sleeve to be adjusted laterally in any direction to a position parallel to said central position, said means permitting one end of the sleeve to be tilted in any direction and held in said tilted position, said holding means comprising a pair of flat plates enclosing the spherical bearing between them and a flat plate having a hole central therein, and a flanged head between which head and plate said holding means is clamped.

16. In a tool holder for a reamer the combination of a sleeve for holding the reamer, means for holding said sleeve normally in a central position, said means permitting said sleeve to be adjusted laterally in any direction to a position parallel to said central position, said means permitting one end of the sleeve to be tilted in any direction and held in said tilted position, a collar on one end of the sleeve, a set screw threaded into the collar and the sleeve for the purpose of clamping the reamer in the sleeve, said holding means comprising a pair of flat plates enclosing the spherical bearing between them and a flat plate having a hole central therein, and a flanged head between which head and plate said holding means is clamped.

OSCAR KLUTE.